(12) United States Patent
Lemke

(10) Patent No.: US 7,528,506 B2
(45) Date of Patent: May 5, 2009

(54) CIRCUIT ARRANGEMENT FOR STARTUP CURRENT LIMITATION FOR ELECTRONIC MODULES CONNECTED TO A MODULE CARRIER

(75) Inventor: Andreas Lemke, Berlin (DE)

(73) Assignee: MSA Auer GmbH, Berlin (DE)

( * ) Notice: Subject to any disclaimer, the term of this patent is extended or adjusted under 35 U.S.C. 154(b) by 351 days.

(21) Appl. No.: 10/575,493

(22) PCT Filed: Sep. 8, 2004

(86) PCT No.: PCT/DE2004/002046

§ 371 (c)(1),
(2), (4) Date: Nov. 29, 2006

(87) PCT Pub. No.: WO2005/041379

PCT Pub. Date: May 6, 2005

(65) Prior Publication Data

US 2007/0108844 A1    May 17, 2007

(30) Foreign Application Priority Data

Oct. 14, 2003  (DE) ................................ 103 49 072

(51) Int. Cl.
*H02M 3/06* (2006.01)
(52) U.S. Cl. ..................................... 307/109
(58) Field of Classification Search .................. 307/109
See application file for complete search history.

(56) References Cited

U.S. PATENT DOCUMENTS

| | | | | |
|---|---|---|---|---|
| 3,411,097 A | * | 11/1968 | Hinrichs | ......................... 330/9 |
| 5,384,492 A | * | 1/1995 | Carlson et al. | .............. 307/147 |
| 5,729,062 A | | 3/1998 | Satoh et al. | |
| 5,910,690 A | * | 6/1999 | Dorsey et al. | ............... 307/141 |
| 6,617,830 B2 | * | 9/2003 | Nozu et al. | .................. 320/166 |

(Continued)

FOREIGN PATENT DOCUMENTS

DE    39 42 480    6/1991

(Continued)

OTHER PUBLICATIONS

International Preliminary Examination Report mailed Sep. 28, 2006 in corresponding PCT Application PCT/DE2004/002046.

(Continued)

*Primary Examiner*—Albert W Paladini
*Assistant Examiner*—Daniel Cavallari
(74) *Attorney, Agent, or Firm*—Davidson Berquist Jackson & Gowdey LLP

(57)    ABSTRACT

A circuit arrangement for the time-delayed startup of electronic modules (20) connected to a module carrier (1) comprises a comparator (28) provided with a reference voltage applied thereto and an operating voltage which is applied via charging capacitors (35 to 38) with different capacitances. The terminals (4c-f to 19c-f) for the charging capacitors are integrated in different combinations into the terminals (4a,b to 19a,b) on the module carrier for the operating voltage. The startup time-delay is determined on the basis of the different time intervals resulting from the different values of the capacitances and lasting until a voltage exceeding the reference voltage is achieved, whereupon the respective electronic module is connected to the voltage source by means of the comparator in a time-delayed manner. (FIG.)

4 Claims, 1 Drawing Sheet

U.S. PATENT DOCUMENTS

| | | | |
|---|---|---|---|
| 2001/0030553 A1* | 10/2001 | Aihara | 324/765 |
| 2003/0020334 A1* | 1/2003 | Nozu | 307/109 |
| 2006/0006893 A1* | 1/2006 | Ho et al. | 324/755 |
| 2006/0006894 A1* | 1/2006 | Ho et al. | 324/755 |

OTHER PUBLICATIONS

International Search Report mailed Jul. 3, 2005, in corresponding PCT application PCT/DE2004/002046.

* cited by examiner

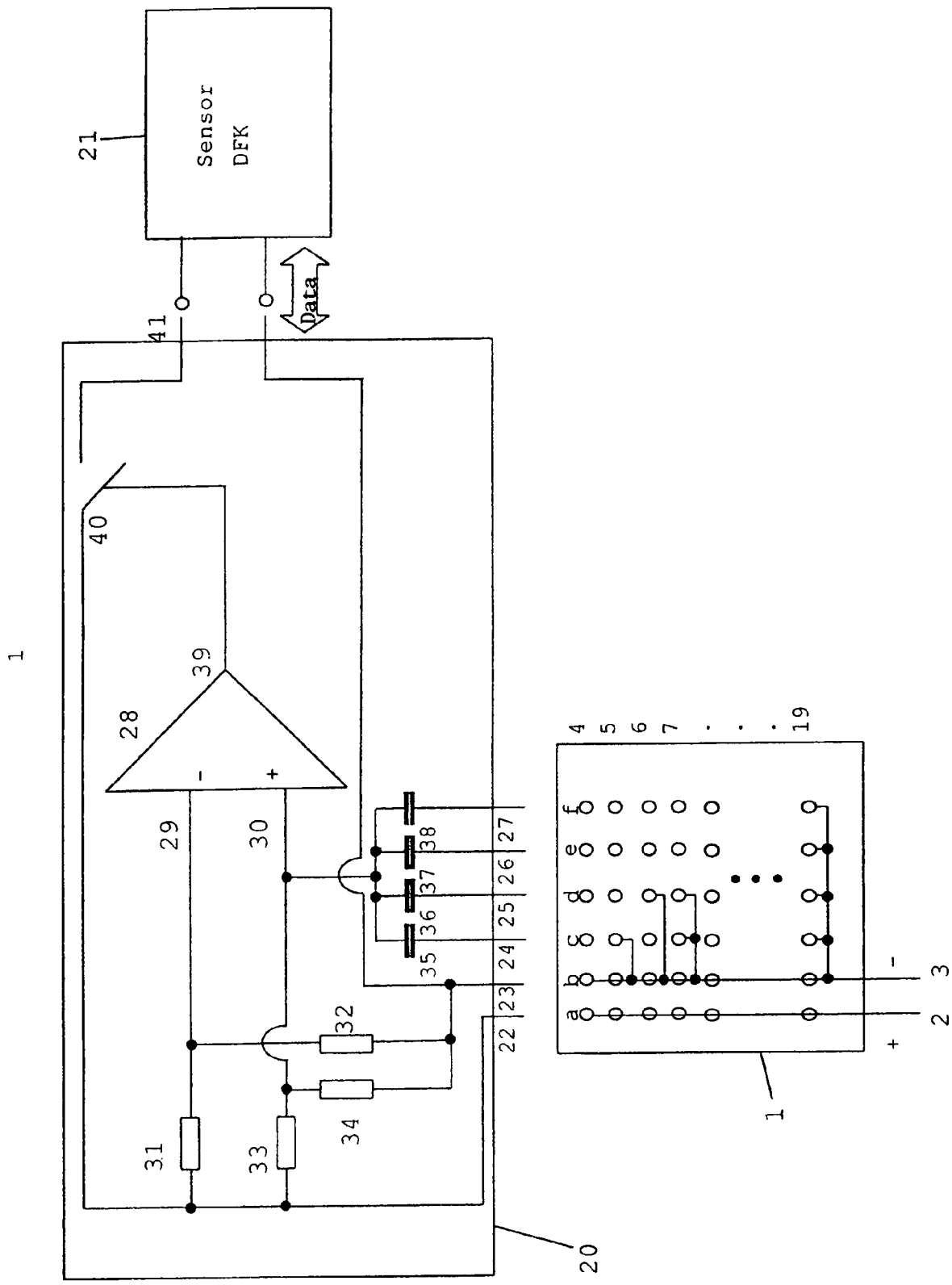

CIRCUIT ARRANGEMENT FOR STARTUP CURRENT LIMITATION FOR ELECTRONIC MODULES CONNECTED TO A MODULE CARRIER

DESCRIPTION

This invention relates to a circuit arrangement for startup current limitation for electronic modules connected to a module carrier with multiple slots.

A startup current surge multiple times higher than the operating current occurs in the known arrangements for power supply to electronic modules connected to a module carrier and the sensors for the recording and analysis of measuring signals that are linked to them, for example, in remote warning systems when these are started up, such surge being due to the cold resistance of the sensors and the power supply boards provided on the electronic modules. In a fully built-out system with a multiplicity of electronic modules and measuring heads, the high startup current surge results in overload of terminal clamps, conductor tracks and the connected power supply units. To prevent such startup surges and the resulting overload, the evaluation units (electronic modules) and measuring heads associated with the module carrier are switched on in a time-delayed manner to limit the startup current.

A basic circuit arrangement for setting a delay time is known from U. Tietze, Ch. Schenk: "Halbleiterschaltungstechnik", Berlin: Springer-Verlag, 9th edition, 1989, pp. 185, 187-189. The time delay is set using a resistor positioned upstream of a comparator and a charging capacitor.

DE 102 00 637 C1 describes a startup current limiter for an air-conditioning system in which individual components are switched on with a time delay. The time delay required is calculated by a central control unit.

DE 42 15 676 A1 describes a circuit arrangement for startup current limitation in an electronic assembly where the current limitation is achieved using a controllable series resistor. The controllable series resistor is a field effect transistor controlled via an RC element by a control unit that regulates it from high-ohm to low-ohm range with a time delay.

Furthermore, a physically scannable slot identification system of a frame for telecommunications equipment is known as an identification bus from DE 39 37 621 C2. The identification bus comprises line links that carry logical potentials and can be jointly analysed as a data word so that preset links assign an identifying address.

The adjusting elements typically required for such circuitry such as potentiometers, jumpers and transistors, the microcontroller-controlled modules required for presetting or calculating the startup delay and the required wiring make this system sophisticated in design, device-intensive, and costly.

It is therefore the object of this invention to provide a circuit arrangement for time-delayed startup of electronic modules connected to a module carrier that requires a reduced control and design effort and can thus be manufactured cost-effectively.

This object is achieved according to the invention by the circuit arrangement comprising the characteristics described in claim 1. The dependent claims disclose useful improvements and embodiments of the invention.

The essence of the invention is that each slot is assigned a coded startup delay that is determined by capacitors of various capacitances that are connected to the electronic module in that these capacitors are connected upstream of a comparator via various combinations of terminals that are integrated into each slot. The respective different capacitance totals and the resulting different time intervals until a reference voltage applied to the comparator is reached and an output signal is given by the comparator leads to the time-delayed startup of the electronic module connected to the respective slot and the sensors connected to it.

The comparator circuit assigned to the electronic module and the associated charging capacitors as well as the different combination of terminals integrated into the slots for the charging capacitors can be manufactured cost-effectively and with little wiring effort. When compared to known solutions of startup delay circuits, measures for module-related settings and use of an additional microcontroller-controlled module are dispensable.

A great number of different signals for time-delayed startup of the electronic modules can be generated depending on the selection of the charged capacitors integrated into each comparator circuit. For example, four capacitors of different capacitances allow the connection of 16 electronic modules with 16 different time delays to the operating voltage. This excludes any overloading of the connections and conductor tracks of the electronic modules, sensors, and power supply units that can occur when all modules are switched on at the same time.

An embodiment of the invention is explained with reference to the only FIGURE that shows a circuit arrangement for startup current limitation.

A circuit arrangement according to the invention consists of a module carrier 1 with power terminals 2 and 3 for an operating voltage and slots 4 to 19, each for connecting one electronic module 20, respectively. The electronic module 20 supplies a sensor or remote data measuring head 21 with the operating voltage and receives data from the sensor/remote data measuring head 21.

Each slot 4 to 19 consists of multiple terminals a through f, e.g., slot 4 has terminals 4a to 4f, slot 19 has terminals 19a to 19f. Each terminal a is connected to the positive operating voltage, each terminal b to the negative operating voltage. Respective terminals c through f are connected to the negative operating voltage according to the table below (0=no connection, 1=connection exists).

| Slot | Terminal | | | | Total/ delay factor |
|------|---|---|---|---|---|
|      | c | d | e | f |   |
| 4    | 0 | 0 | 0 | 0 | 0 |
| 5    | 1 | 0 | 0 | 0 | 1 |
| 6    | 0 | 1 | 0 | 0 | 2.2 |
| 7    | 1 | 1 | 0 | 0 | 3.2 |
| 8    | 0 | 0 | 1 | 0 | 4.7 |
| 9    | 1 | 0 | 1 | 0 | 5.7 |
| 10   | 0 | 1 | 1 | 0 | 6.9 |
| 11   | 1 | 1 | 1 | 0 | 7.9 |
| 12   | 0 | 0 | 0 | 1 | 10 |
| 13   | 1 | 0 | 0 | 1 | 11 |
| 14   | 0 | 1 | 0 | 1 | 12.2 |
| 15   | 1 | 1 | 0 | 1 | 13.2 |
| 16   | 0 | 0 | 1 | 1 | 14.7 |
| 17   | 1 | 0 | 1 | 1 | 15.7 |
| 18   | 0 | 1 | 1 | 1 | 16.9 |
| 19   | 1 | 1 | 1 | 1 | 17.9 |

An electronic module 20 comprises terminals 22 to 27. Each of the slots 4 to 19 accordingly consists of terminals 4a-4f through 19a-19f. If, for example, an electronic module 20 is connected to slot 4, its terminals 22 to 27 are connected to the terminals 4a through 4f, and if an electronic module 20 is connected to slot 19, its terminals 22 to 27 are connected to the terminals 19a through 19f.

The electronic module 20 uses a circuit arrangement to supply the sensor 21. This circuit arrangement consists of a comparator 28 with a positive input 29 and a negative input 30. A reference voltage is applied to the negative comparator input via resistors 31 and 32. The operating voltage is applied via resistors 33 and 34 and capacitors 35, 36, 37, and 38 with different capacitances to the positive comparator input 29. The capacitors 35, 36, 37 and 38 let the voltage at the positive comparator input rise within a time interval t1. When the voltage at the positive comparator input 29 exceeds the voltage at the negative comparator input 30, a signal is available at the comparator output 39 that operates a switch 40. This switches the positive operating voltage at the voltage port 2 to the positive output 41 of the electronic module and the sensor 21 is supplied with supply voltage.

When an electronic module is connected, the contact configuration of each slot 4 through 19 described in the table results in connecting a respective combination of capacitors 35, 36, 37, and 38 for the slot upstream of the positive comparator input. This combination is different for each slot and results in a time constant t1 associated with the slot after which the voltage at the positive comparator input 29 exceeds the voltage at the negative comparator input 30. The time delay t1 after which the sensor receives its operating voltage is determined by the slot for each electronic module 20 and its associated sensor 21.

Thus, 16 different delay intervals can be generated when using four terminals c, d, e, and f and respective four capacitors 35, 36, 37, and 38 with different capacitances. Column 6 of the table above shows the delay values for each slot if capacitors with capacitance ratios, e.g., 35=1.0/36=2.2/37=4.7/38=10.0 are used.

| List of reference symbols | |
| --- | --- |
| 1 | Module carrier |
| 2 | Positive power terminal on 1 |
| 3 | Negative power terminal on 1 |
| 4 to 19 | Slot for electronic module |
| 20 | Electronic module |
| 21 | Sensor/remote data measuring head |
| 22 to 27 | Electronic module ports |
| 28 | Comparator |

-continued

| List of reference symbols | |
| --- | --- |
| 29 | Pos. comparator input |
| 30 | Neg. comparator input |
| 31 | Resistor for reference voltage |
| 32 | Resistor for reference voltage |
| 33 | Charging resistor |
| 34 | Charging resistor |
| 35 to 38 | Capacitors |
| 39 | Comparator output |
| 40 | Electronic switch |
| 41 | Positive output of the electronic module |

The invention claimed is:

1. A circuit arrangement for startup current limitation for electronic moduls connected to a module carrier with a multitude of slots, characterized in that each electronic module (20) is associated for time-delayed power supply that varies from slot to slot with a comparator connected to the respective slot (4 to 19) to which a reference voltage is applied and upstream of which charging capacitors (35 to 38) are provided which have different capacitances and are connected in different numbers and capacitances to the respective slot (4 to 19), the varying capacitance totals determining the length of the startup delay where exceeding the reference voltage after the respective charging time represents a signal for applying the operating voltage to the respective electronic module (20).

2. The circuit arrangement according to claim 1, characterized in that resistors (31, 32) are connected upstream of the comparator (28) for providing the reference voltage and charging resistors (33, 34) are connected upstream of the charging capacitors (35 to 38).

3. The circuit arrangement according to claim 1, characterized in that the slots (4 to 19) of the module carrier (1) comprise power terminals (4a,b to 19a,b) for the electronic module (20) and terminals (4c-f to 19c-f) for the charging capacitors (35 to 38), the terminals (4c-f to 19c-f) being connected in varying configurations to the respective terminal (4b to 19b).

4. The circuit arrangement according to claim 1, characterized in that the electronic module (20) is an evaluating unit for recording and analysing measuring signals that is connected to sensors (21).

* * * * *